United States Patent
Fessler-Knobel et al.

(10) Patent No.: US 8,739,851 B2
(45) Date of Patent: Jun. 3, 2014

(54) DEVICE FOR FASTENING AND DETACHING A COMPONENT, AND METHOD THEREFOR

(75) Inventors: Martin Fessler-Knobel, Munich (DE); Roland Huttner, Jesenwang (DE)

(73) Assignee: MTU Aero Engines GmbH, Munich (DE)

( * ) Notice: Subject to any disclaimer, the term of this patent is extended or adjusted under 35 U.S.C. 154(b) by 49 days.

(21) Appl. No.: 13/504,370

(22) PCT Filed: Oct. 30, 2010

(86) PCT No.: PCT/DE2010/001278
§ 371 (c)(1),
(2), (4) Date: Apr. 26, 2012

(87) PCT Pub. No.: WO2011/050793
PCT Pub. Date: May 5, 2011

(65) Prior Publication Data
US 2012/0211151 A1 Aug. 23, 2012

(30) Foreign Application Priority Data
Oct. 31, 2009 (DE) .......... 10 2009 051 555

(51) Int. Cl.
B29C 65/52 (2006.01)
B32B 37/00 (2006.01)
B32B 43/00 (2006.01)

(52) U.S. Cl.
USPC .......................... 156/539; 156/765

(58) Field of Classification Search
USPC ......... 156/247, 280, 297, 701, 716, 538, 539, 156/569, 750, 765; 29/743, 832
See application file for complete search history.

(56) References Cited

U.S. PATENT DOCUMENTS

| 6,503,356 B1 | 1/2003 | Sakai et al. ............ 156/247 |
| 2007/0221328 A1 | 9/2007 | DeMeter et al. ........... 156/344 |
| 2009/0025220 A1 | 1/2009 | Fessler-Knobel | |
| 2012/0011703 A1 | 1/2012 | Fessler-Knobel et al. ...... 29/559 |

FOREIGN PATENT DOCUMENTS

| CN | 201795205 U | 4/2011 | |
| DE | 19961940 | 8/2001 | |
| DE | 10 2007 020 957 | 11/2008 | |
| DE | 10 2008 012 299 | 9/2009 | |
| EP | 1520601 A2 * | 4/2005 | ............ A61F 3/02 |
| WO | WO 2010/105612 | 9/2010 | |

OTHER PUBLICATIONS

English Abstract of EP 1,520,601.*
Machine English translation of EP 1,520,601.*

* cited by examiner

*Primary Examiner* — Sing P Chan
(74) *Attorney, Agent, or Firm* — Davidson, Davidson & Kappel, LLC

(57) ABSTRACT

A device (2) having at least one connecting element (24, 26) for fastening a component (4) to, respectively for detaching it from a component carrier (6) using adhesive bonds; a mechanical peeling device (8) being provided for breaking the adhesive bonds. Also a method for fastening a component (4) to, respectively for detaching it from a component carrier (6).

6 Claims, 3 Drawing Sheets

DEVICE FOR FASTENING AND DETACHING A COMPONENT, AND METHOD THEREFOR

The present invention relates to a device for fastening and detaching a component, and to a method for fastening and detaching a component.

Components often pass through a multitude of processing stations before reaching their finished form. To position the components in the processing stations, component carriers are used within which the components are secured. The components must be able to be quickly and reliably fastened in place in the component carriers, as well as easily detached therefrom.

BACKGROUND

The German Patent Application DE 10 2007 020 957 A1 of the Applicant provides for fastening a turbine blade to a component carrier using a bonded connection, for example. The component carrier has a contour-close bonding surface, onto which an adhesive agent is applied over a large area. Upon application of the adhesive agent, the turbine blade is positioned on the component carrier, and the adhesive agent is thermally cured. A thermal process is preferably used to release the bonded connection. However, a chemical process may also be used.

It is likewise known to fasten a component to a component carrier via a multitude of connecting elements, respectively adapters, using adhesive bonds. However, due to the multitude of bonded connections and the high adhesive forces, it is relatively costly to chemically or thermally detach the connecting elements from the component and the component carrier.

SUMMARY OF THE INVENTION

It is an object of the present invention to provide a device for fastening a component to, respectively for detaching it from a component carrier that will overcome the aforementioned disadvantages and make it possible for adhesive bonds to be lifted off quickly and simply, as well as a method for quickly and simply fastening a component to and for detaching a component from a component carrier.

The present invention provides a device including at least one connecting element for fastening a component to a component carrier using adhesive bonds. In accordance with the present invention, the device features a peeling device for breaking the adhesive bonds. The particular advantage of this approach is that there is no longer a need for any thermal damage to and thus for any weakening of the adhesive bond. The bonded connections are lifted off in a purely mechanical process, whereby the force expended during breaking may be significantly reduced by the peeling process. Moreover, it is advantageous that the mechanical breaking makes it possible to automate the detachment process, allowing all of the connecting elements to be removed from the component, as well as from the component carrier within a very short period of time.

In one specific embodiment, the peeling device features a wedge-shaped sliding element that is guided within a component carrier-side guideway. It may be especially beneficial for the guideway to be constituted of two pedestals for accommodating the component. When a plurality of connecting elements are used, this allows the connecting elements to be successively detached from the component carrier, respectively from the pedestals, and at the same time from the component in response to a movement of the sliding element along the guideway.

Another exemplary embodiment provides that the component carrier have at least one limit stop for each connecting element for positioning of the same. The peeling device may feature a sliding element having at least one jaw that is open in the sliding direction, so that, in response to a movement of the sliding element toward the component carrier and the component, the jaw comes into contact with the pin, and the at least one connecting element is pressed against the limit stop, whereby it is releasable from the component carrier and the component.

In another exemplary embodiment, the peeling device features a plier-type rotary tool. A rotary tool of this kind is particularly inexpensive to manufacture.

To adjust an optimal adhesive gap width, it is advantageous for distance elements, whose height corresponds to the particular adhesive gap width, to be configured between the at least one connecting element and the component, respectively the component carrier.

In one exemplary embodiment, a component carrier-side bonding surface for receiving the connecting element is formed as an inclined surface, respectively is obliquely configured, so that, upon placement of the component to be connected at the foot of the inclined plane, the connecting element is automatically fixed in its nominal position, respectively is moved into the same.

In a method according to the present invention for fastening a component to, respectively for detaching it from a component carrier using adhesive bonds, the component is first fastened to the component carrier via at least one connecting element. The bonded connections between the connecting element and the component, respectively the component carrier are then cured, and the component is processed accordingly. The adhesive bonds are subsequently lifted off by the peeling action.

In one exemplary embodiment, the at least one adhesive bond between the connecting element and the component and the at least one adhesive bond between the connecting element and the component carrier are lifted off simultaneously. As a result, only one peeling operation is needed, making it possible for the component to be detached from the component carrier within a very short period of time.

Preferably, the at least one adhesive bond between the connecting element and the component is lifted off by lever forces, and the at least one adhesive bond between the connecting element and the component carrier by torsional forces. This may be accomplished by a sliding element, for example, that is moved toward the component carrier and the component, thereby lifting the connecting element off of the component carrier. In the same way, the connecting element may be twisted off of the component carrier by a rotary tool.

In one exemplary embodiment, the connecting element automatically fixes itself in its nominal position. Faulty positioning is thereby ruled out. Due, for example, to the weight force thereof, the connecting element may glide along the component carrier, and the nominal position thereof may be defined by a contact making with the component.

Other advantageous exemplary embodiments of the present invention constitute the subject matter of other dependent claims.

BRIEF DESCRIPTION OF THE DRAWINGS

Preferred exemplary embodiments of the present invention are described in greater detail in the following with reference to schematic representations. In the drawing.

DETAILED DESCRIPTION

Figure 1:
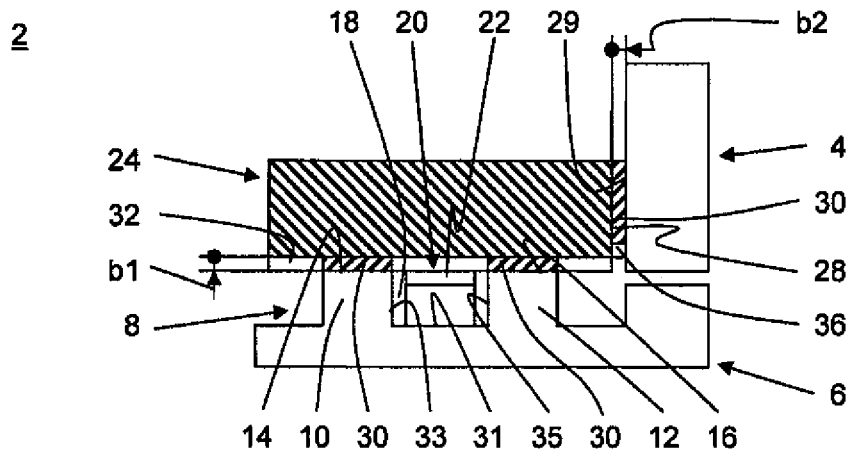
FIG. 1 shows a part-sectional view of a first exemplary embodiment of a device according to the present invention.

In the figures, equivalent structural elements are provided with the same reference numerals. If one figure includes a plurality of same structural elements, for the sake of clarity, only some of these structural elements are provided with a reference numeral.

FIG. 1 illustrates a device 2 for placing a component 4 on a component carrier 6 having a peeling, respectively mechanical separating device 8 according to the present invention. Component carrier 6 has two mutually spaced apart pedestals 10, 12, which each feature a plurality of bonding surfaces 14, 16. Pedestals 10, 12 bound a guideway 18 within which a wedge 20 having an inclined surface 22 is guided.

In the illustrated exemplary embodiment, component 4 has a rectangular cross section and extends lengthwise in the direction of component carrier 6. It is fastened via a plurality of connecting elements 24, 26 (see FIG. 2) to component carrier 6.

Connecting elements 24, 26 are rectangular in shape and feature two mutually spaced apart longitudinal strips 32, 34 that are configured in the edge region and support connecting elements 24, 26 on bonding surfaces 14, 16. They also have an edge region-side end strip 36 that extends from a spherical end face 28 and engages on an opposite component surface 29.

Longitudinal strips 32, 34 and end strip 26 are permanently affixed to connecting elements 24, 26, respectively are formed in one piece therewith. They define adhesive gaps having an optimal width b1, b2, respectively, in which adhesive agent 30 is placed in the region of bonding surfaces 14, 16 and component surface 29 in order to form three bonded connections. Electromagnetic radiation (for example, light) is preferably used for curing adhesive agent 30.

Guideway 18 has a rectangular cross section having a component carrier-side plane guide surface 31 for guiding wedge 20. Guideway 18 is laterally bounded by mutually facing pedestal surfaces 33, 35.

Figure 2:
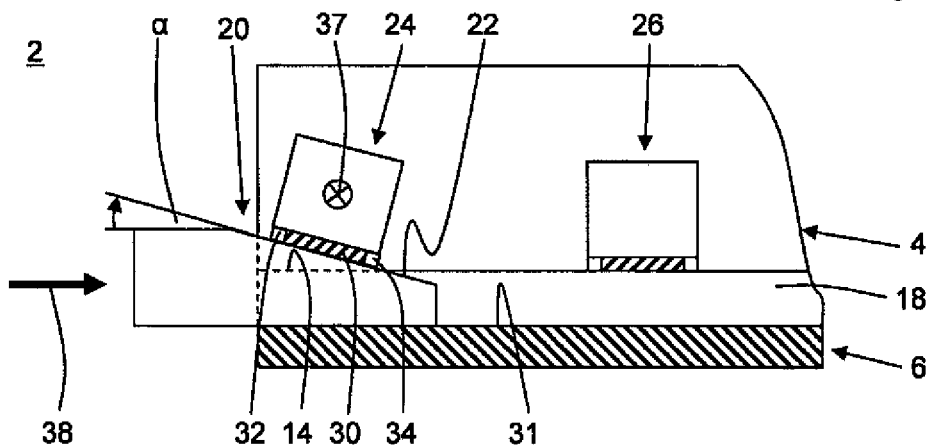
FIG. 2 shows a sectional representation of the device from FIG. 1.

To detach connecting elements 24, 26 from component carrier 6, respectively component 4, wedge 20 is placed in guideway 18 and moved on guide surface 31 along guideway 18, as indicated by arrow 38, so that it comes into contact by inclined surface 22 thereof against longitudinal strip 32 of connecting element 24 facing it in the first instance, as shown on the left in the representation in FIG. 2. Wedge 20 is moved further, and connecting element 24 is lifted off of component carrier 6 by the peeling action. In the process, it is tilted away over rear longitudinal strip 34 thereof, and the adhesive bonds in the region of bonding surfaces 14, 16 are broken. At the same time, connecting element 24 is quasi twisted about longitudinal axis 37 thereof, and the adhesive bond in the region of end face 28 is broken by the rotary peeling action. Once first connecting element 24 is detached, wedge 20 is moved further in arrow direction 38, and adjacent connecting element 26 is detached from component carrier 6, respectively component 4 in the same manner. Thus, component carrier-side adhesive bonds in the region of bonding surfaces 14, 16 are lifted off by lever forces, and the component-side adhesive bond in the region of end face 28 is lifted off by torsional forces.

When UHU Multifix is used as adhesive agent 30 having a curing time of 7.5 h, and given an adhesive gap width of b1, b2=0.4 mm, as well as a wedge angle $\alpha=10°$, light wedge impacts already suffice to detach connecting elements 24, 26, given an effective spherical end face 28 proximate to component 4 of 180 mm$^2$ and two effective bonding surfaces 14, 16 of 150 mm$^2$ each proximate to component carrier 6.

Figure 3:
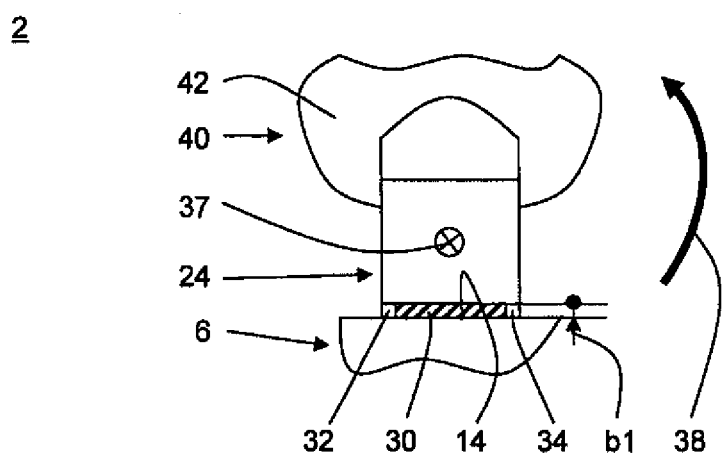
FIG. 3 shows a second exemplary embodiment of the present invention.

FIG. 3 shows an exemplary embodiment where a component (not shown) that is connected to a component carrier 6 via connecting elements 24 is detached from component carrier 6 by the twisting action of a rotary tool 40. The component, component carrier 6 and connecting element 24 are essentially designed in accordance with the above descriptions of FIGS. 1 and 2, so that explanations relevant thereto are omitted to avoid repetitive explanations. In principle, merely wedge 20 is replaced by rotary tool 40.

Rotary tool 40 is used for twisting 38 connecting element 24 counterclockwise quasi about longitudinal axis 37 thereof, so that, in accordance with the representation, connecting element 24 is tilted away about left longitudinal strip 32 thereof. To grip around portions of connecting element 24, it features a jaw 42 having two movable claws. As shown in the exemplary embodiment, rotary tool 40 preferably acts via jaw 42 thereof orthogonally to bonding surface 14, respectively component carrier 6, i.e., quasi laterally on connecting element 24. However, it may also act via jaw 42 thereof orthogonally to the face side, respectively to component 4, i.e., on connecting element 24, quasi at the face side thereof.

When UHU Multifix is used as adhesive agent 30 having a curing time of 7.5 h, and given an adhesive gap width between connecting element 24 and component carrier 6, respectively the component of b1, b2=0.4 mm, an approximate break-off torque of M=80 Nm suffices, given a quasi-lateral application of rotary tool 40 on connecting element 24, given an effective adhesive bond in the spherical end face region facing away from the viewer and proximate to component 4 of 180 mm$^2$, as well as given two effective bonding surfaces 14, 16 proximate to component carrier 6 of 150 mm$^2$ each.

When UHU Multifix is used as adhesive agent 30 having a curing time of 7.5 h, and given an adhesive gap width of b1, b2=0.4 mm, a break-off torque approximately within the limits of 50 Nm≤M≤55 Nm suffices given a quasi face-side application of rotary tool 40 on connecting element 24, given a plane and adhesion-active end face proximate to component 4 of 210 mm$^2$, and given two effective adhesive surfaces 14, 16 of 150 mm$^2$ each proximate to component carrier 6.

Figure 4:
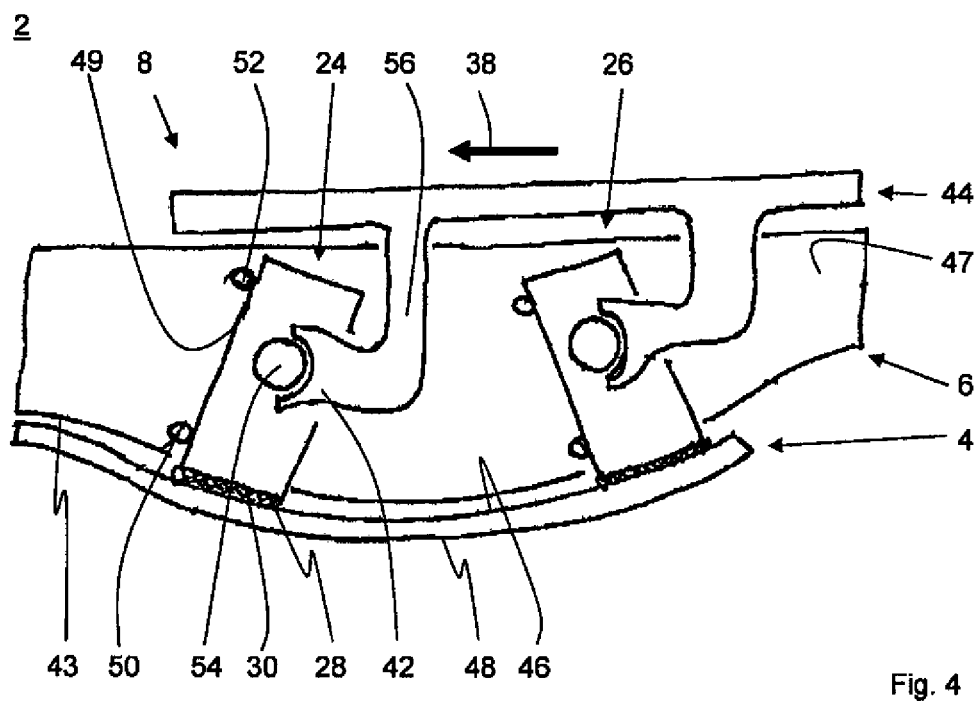
FIG. 4 shows a lateral view of a third exemplary embodiment according to the present invention.

FIG. 4 shows a third device 2 according to the present invention for fastening a component 4 to, respectively for detaching it from a component carrier 6, having a peeling device 8.

Component 4 is provided in a plate form with a concave surface 46 facing component carrier 6 and with a convex surface 48 facing away from component carrier 6. It is connected to component carrier 6 via a plurality of connecting elements 24, 26. In each instance, component 4 is connected to connecting elements 24, 26 via a face-side bonded connection that is produced by an adhesive agent 30 which is thermally cured by electromagnetic radiation, for example, and which is placed in an adhesive gap between concave surface 46 and a respective face side 28 of connecting elements 24, 26.

Component carrier 6 has a component carrier surface 43 that closely conforms to the contour of concave surface 46 of component 4 and features two mutually spaced apart limit stops 50, 52 for positioning one of connecting elements 24, 26, respectively. Limit stops 50, 52 extend from a lateral surface 47 of component carrier 6 extending orthogonally or nearly orthogonally to concave surface 46. They each extend away from lateral surface 47 in such a way that they act on connecting elements 24, 26 only in a lateral surface region 49 proximate to the adhesive gap (compare FIG. 5).

Figure 5:
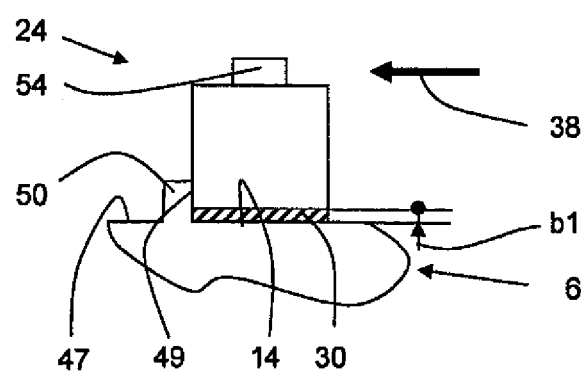
FIG. 5 shows a detailed representation of the device from FIG. 4.

Connecting elements 24, 26 are rectangular in shape and are joined in each case to component carrier 6 via an adhesive agent 30 in the region of a component carrier-side bonding surface 14 (compare FIG. 5). They rest by respective lateral surface region 49, which is proximate to the adhesive gap, against limit stops 50, 52. They each feature a pin 54 on a side facing away from the component carrier-side adhesive bond.

Peeling device 8 has a slide element 44 that is movable relative to component carrier 6 and to component 4 and that features a plurality of L-shaped arms 56. The number of arms 56 corresponds to the number of connecting elements 24, 26, respectively of pins 54; to grip around portions of pins 54, arms 56 being provided at the extremities thereof with a jaw 42 that is open in the direction of limit stops 50, 52 and in the sliding direction, and with two claws.

In response to a displacement of slider element 44 in arrow direction 38, the claws come into contact with pins 54 of connecting elements 24, 26. Connecting elements 24, 26 are tilted away over limit stops 50, 52, whereby, in the case of all connecting elements 24, 26, the component carrier-side bonded connection in the region of bonding surfaces 14, as well as the component-side bonded connection in the region of end faces 28 thereof are released at the same time, and component 4 is consequently removed from component carrier 8 and connecting elements 24, 26.

In contrast to the wedge approach described above with reference to FIGS. 1 and 2, in this exemplary embodiment, connecting elements 24, 26 are not detached sequentially in time, but rather simultaneously, respectively concurrently. Another distinction between the wedge approach according to FIGS. 1 and 2 and the exemplary embodiment according to FIGS. 4 and 5 resides in that, in the wedge approach, two bonded connections 14, 16 are formed between each connecting element 24, 26 and component carrier 6 respectively, whereas, in the exemplary embodiment described here, connecting elements 24, 26 are connected only via one bonded connection to component carrier 6.

In one exemplary embodiment (not shown) of the present invention, connecting elements 24, 26 are detached successively in time.

Figure 6:
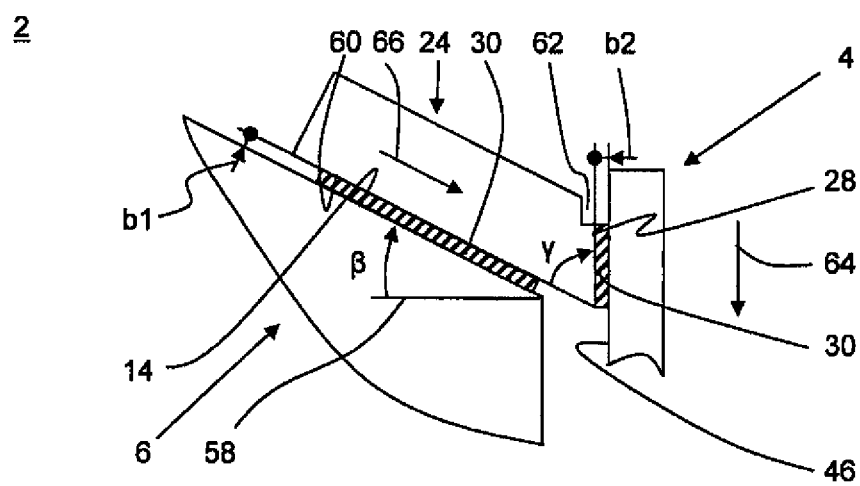
FIG. 6 shows another exemplary embodiment of the present invention.

FIG. 6 shows an exemplary embodiment of a device 2 for fastening and detaching a component 4, having a component carrier-side bonding surface 14 for attaching a rectangular-shaped connecting element 24, which, as an inclined plane, is adjusted at an angle $\beta$ to horizontal axis 58 of component carrier 6. Component 4 is configured at the foot of the inclined plane, respectively bonding surface 14, and is securely bonded via connecting element 24 to component carrier 6.

Connecting element 24 has a joining surface 60 facing component carrier 6 and an end face 28 facing component 4. To form an adhesive gap having a constant adhesive gap width b1, b2 in each case, joining surface 60 and end face 28 are configured to conform closely to the contour of bonding surface 14, respectively to opposing component surface 46. In the illustrated exemplary embodiment, end face 28 is hereby adjusted by angle $\gamma = 90° - \beta$ relative to joining surface 60, given an essentially vertically extending component surface 46. To prevent connecting element 24 from striking component 4 by an end face-side edge region distal to component carrier 6, which would make it unfeasible to produce a quality bond or a bond of sufficient quality between end face 28 and component surface 46, end face 28 is recessed in this edge, respectively peripheral region, respectively connecting element 24 is provided with a recess 62 in this edge region.

The adjustment of bonding surface 14 of component carrier 6 relative to horizontal axis 58 thereof induces connecting element 24 to automatically move into its nominal position and be fixed therein, since, during adhesive bonding, it automatically remains in its desired position on component 4 under the influence of weight force 64, ruling out any accidental slipping and thus faulty positioning of component 4 to be connected. For example, it is possible for connecting element 24 to glide on adhesive agent 30 in adhesive gap b1 in direction 66 of component 4 until the optimal width of adhesive gap b2 is adjusted. For example, this may be accomplished, as shown in FIG. 1, in that connecting element 24 features an adhesive-free end strip 36, whose height corresponds to nominal width b2 and by way of which it comes to into contact with component 4, respectively with component surface 46 thereof.

Described here are a device 2 having at least one connecting element 24, 26 for fastening a component 4 to, respectively for detaching it from a component carrier 6 using adhesive bonds, a mechanical peeling device 8 being provided for breaking the adhesive bonds, as well as a method for fastening a component 4 to, respectively for detaching it from a component carrier 6.

What is claimed is:

1. A device for attaching a component to a component carrier, respectively for detaching the component from the component carrier, the component fastenable via at least one connecting element to the component carrier using adhesive bonds, the device comprising:
a mechanical separator for breaking the adhesive bonds, the separator having a sliding element displaceable relative to the component carrier and the component; wherein the component carrier has at least one limit stop for positioning the connecting element.

2. The device as recited in claim 1 wherein on a component carrier side, the separator has a wedge-shaped sliding element guided within a guideway.

3. The device as recited in claim 2 wherein on both sides of the guideway, a pedestal is configured on the component carrier to accommodate the connecting element.

4. The device as recited in claim 1 wherein the sliding element has at least one jaw open in the sliding direction.

5. The device as recited in claim 1 further comprising distance elements for adjusting an optimal adhesive gap width.

6. A device for attaching a component to a component carrier, respectively for detaching the component from the component carrier, the component fastenable via at least one connecting element to the component carrier using adhesive bonds, the device comprising:
a mechanical separator for breaking the adhesive bonds, the separator having a sliding element displaceable relative to the component carrier and the component; and
distance elements for adjusting an optimal adhesive gap width.

* * * * *